Figure 1:
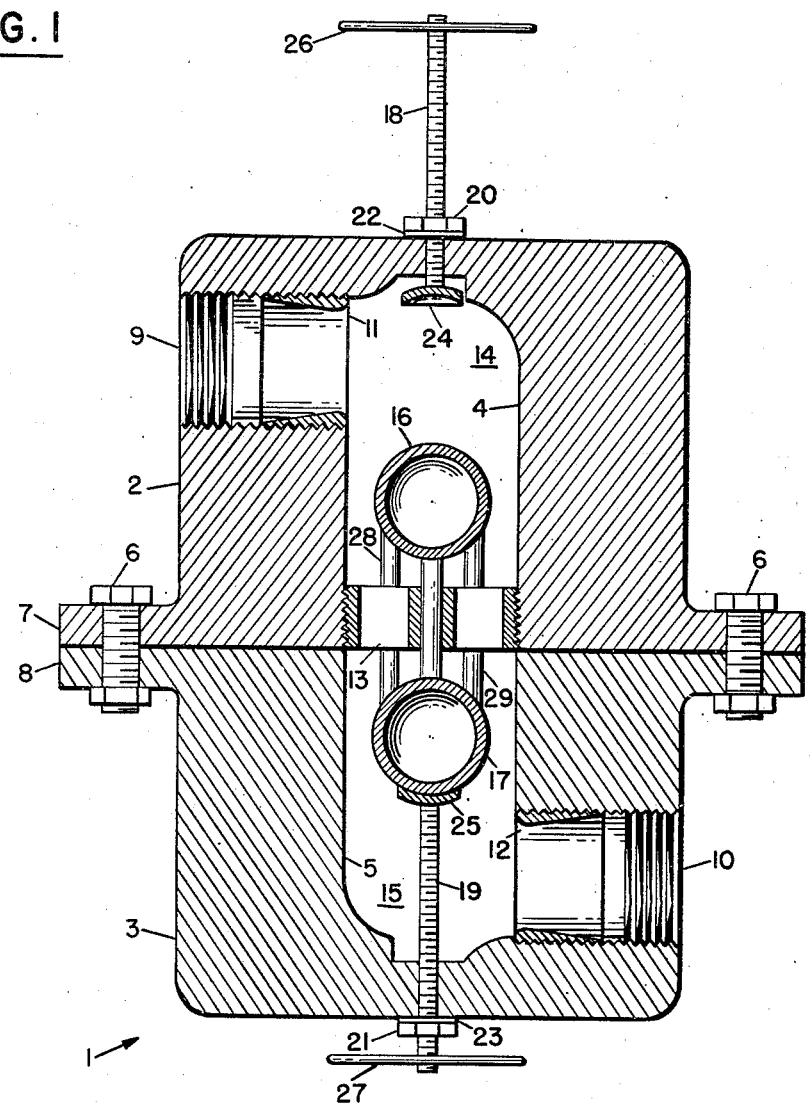

Dec. 16, 1947.  W. H. McCULLOCH  2,432,536
VALVE
Filed Oct. 31, 1945

INVENTOR
WINFIELD H. McCULLOCH
BY
Ralph L Chappell
ATTORNEY

Patented Dec. 16, 1947

2,432,536

UNITED STATES PATENT OFFICE 2,432,536

VALVE

Winfield H. McCulloch, United States Navy, Baytown, Tex.

Application October 31, 1945, Serial No. 625,930

3 Claims. (Cl. 277—71)

(Granted under the act of March 3, 1883, as amended April 30, 1928; 370 O. G. 757)

This invention relates to valves and more particularly to check valves.

Objects of the invention are to provide improved check valves capable of selectively passing fluids in either of two directions and preventing passage in the opposite direction, or of permitting free passage in either drection, or of preventing passage altogether; to provide check valves having the foregoing characteristics and being of simple and rugged construction; and to provide for carrying out the foregoing objects in a facile, economical and efficient manner.

In accomplishing these and other objects of the present invention, I have provided improved details of structure, the preferred form of which is illustrated in the accompanying drawing, wherein:

The single figure is a longitudinal sectional view of a check valve embodying the features of the present invention.

Referring more in detail to the drawing:

The valve of my invention comprises a body 1, which is preferably formed sectionally, having an upper section 2 and a lower section 3. The sections 2 and 3 have mating cylindrical bores 4 and 5, respectively, and are secured together with the bores in aligned relation by appropriate means, as by bolts 6 threadedly engaged in external flanges 7 and 8 on the sections. The bores 4 and 5 thus, in effect, form one continuous bore within the body.

The sections 2 and 3 contain flow apertures 9 and 10, respectively, located adjacent the outer ends of the bores 4 and 5 and preferably disposed perpendicularly thereto. The flow apertures are adapted to receive fittings to function as outlets or inlets and may be interiorly threaded for this purpose. The ends of the flow apertures adjacent the bores have seats 11 and 12 formed therein that may be in the form of inserts threadedly or otherwise secured in the apertures, as shown, or may be formed integrally with the body.

A spider 13 is secured within the bore, preferably by threaded engagement, as shown. The spider divides the bore into a pair of chambers 14 and 15, but permits relatively unrestricted flow of fluids between the chambers.

Ball closure members 16 and 17 are located within the chambers 14 and 15, respectively, and are preferably made hollow to decrease their weight. The closure members 16 and 17 are adapted to engage the seats 11 and 12, respectively, to close the valve in a manner explained in the discussion of the operation of the invention.

A pair of spindles 18 and 19 are threadedly engaged with suitable bearings 20 and 21 at the ends of the body 1 and extend into the bore therein preferably through suitable stuffing glands or leak-proof washers 22 and 23. The spindles carry concave discs 24 and 25 at their inner ends adapted to engage the closure members 16 and 17 to hold them out of engagement with the seats 11 and 12 when the spindles are moved inwardly. The figure shows the spindle 19 in such inward position. Preferably the spindles 18 and 19 carry operating hand wheels 26 and 27 at their outer ends.

Preferably a series of spaced posts 28 and 29 are provided on each side of the spider 13 to hold the closure members 16 and 17 out of engagement with the spider and thereby decrease the resistance to flow through the valve.

Operation

The valve may be placed in a line by securing the ends of the line to the valve at the flow apertures 9 and 10.

So placed, the valve may be used as a check valve to permit flow in either direction as desired while preventing flow in the other direction. It may be operatively reversed to change the direction of flow permitted. It may be opened to permit flow in either direction. Or, it may be closed to prevent flow altogether. These adjustments are accomplished by adjustment of the spindles 18 and 19 with respect to the body.

When it is desired to permit flow through the valve with the fluid entering the aperture 9 and passing out the aperture 10 and to prevent flow in the opposite direction, the spindles are adjusted in the manner shown in Fig. 1; that is, the spindle 18 is moved outwardly with respect to the body and the spindle 19 moved inwardly. Fluid entering the aperture 9 flows freely through the valve. If any reverse flow tends to occur, the closure member 16 is forced into engagement with the seat 11 by such flow and the reverse flow is thereby stopped. Engagement of the disc 25 with the closure member 17 prevents this closure member from engaging the seat 12 thereby permitting flow in the desired direction.

It is desired to reverse the direction of flow permitted through the valve, the spindle 18 may be adjusted inwardly and the spindle 19 adjusted outwardly. Such adjustment retains the closure member 16 out of engagement with the seat 11 and allows the closure member 17 to engage the seat 12.

If it is desired to open the valve to permit flow in either direction, the spindles 18 and 19 are both moved to their inner positions of adjustment, thus retaining both closure members out of engagement with their cooperating seats. If it is desired to close the valve to prevent flow altogether, the spindles 18 and 19 are both moved to their outer positions of adjustment, thus leaving both closure members free to engage their cooperating seats.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. In a valve, a body having a cylindrical bore, flow apertures disposed perpendicularly to said bore adjacent opposite ends thereof, and seats in said flow apertures, a spider supported in said bore intermediate its ends dividing said bore into first and second chambers, ball closure members in said chambers cooperable with said seats to close said valve, spindles adjustably engaged with the ends of said body and extending into said chambers adapted to hold said closure members out of engagement with said seats, and means on said spider extending into said chambers to hold said closure members out of contact with said spider.

2. In a valve, a body having a cylindrical bore, flow apertures disposed perpendicularly to said bore adjacent opposite ends thereof, and seats in said flow apertures, a spider supported in said bore intermediate its ends dividing said bore into first and second members, ball closure members in said chambers cooperable with said seats to close said valve and spindles adjustably engaged with the ends of said body and extending into said chambers adapted to hold said closure members out of engagement with said seats.

3. In a valve, a body having a bore, flow apertures angularly disposed relative to said bore in spaced relation to each other and having seats in said flow apertures, means dividing said bore into first and second chambers and being apertured to permit flow therethrough, closure members in said chambers cooperable with said seats to close said valve, and means adjustably supported on said body adapted to hold said closure members out of engagement with said seats.

WINFIELD H. McCULLOCH.

REFERENCES CITED

The following references are of record in the file of this patent:

UNITED STATES PATENTS

| Number | Name | Date |
|---|---|---|
| 971,295 | Menear | Sept. 27, 1910 |
| 999,608 | Stucky | Aug. 1, 1911 |
| 2,270,510 | Cox | Jan. 20, 1942 |
| 2,344,354 | Hallerstrom | Mar. 4, 1944 |